March 28, 1939. H. B. LINDSAY 2,152,521
METHOD OF LOCKING SCREWS
Filed Nov. 15, 1937
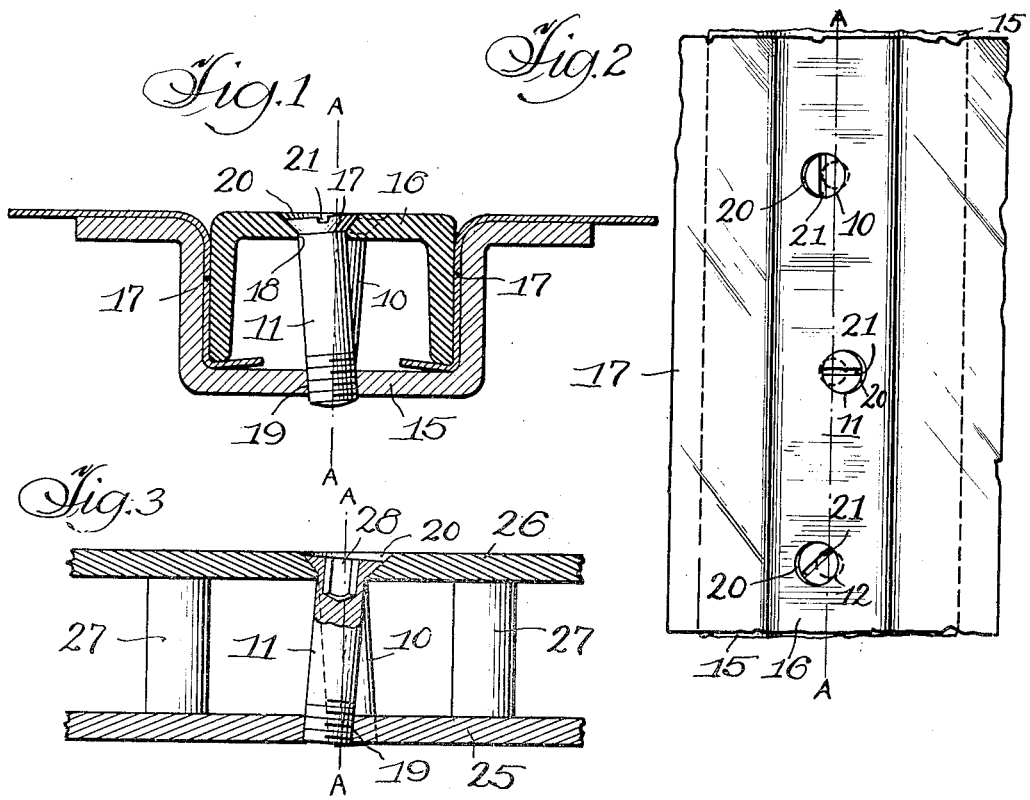

Patented Mar. 28, 1939

2,152,521

UNITED STATES PATENT OFFICE 2,152,521

METHOD OF LOCKING SCREWS

Harvey B. Lindsay, Evanston, Ill.

Application November 15, 1937, Serial No. 174,620

3 Claims. (Cl. 189—36)

This invention relates to improvements in methods for locking threaded fastening means so as to resist unscrewing or loosening of the fastening member. The principal object of my invention is to provide a simple and economical method for overcoming the tendency of threaded screws to become loosened, particularly where they are used for fastening structural members that are subject to bending stresses and vibration.

The invention may best be understood by reference to the accompanying drawing, in which Fig. 1 is a view in cross-section of a post and stiffening member utilized in railroad car and similar structures, and showing one form of my invention applied thereto.

Fig. 2 is a fragmentary plan view of the structure shown in Fig. 1.

Fig. 3 is a sectional view showing a modified form of my invention as applied to a pair of spaced structural members.

Referring now to details of the embodiment of my invention illustrated in Figs. 1 and 2, a plurality of screws indicated generally at 10, 11 and 12 are employed to secure two spaced members 15 and 16 together. In the particular structural arrangement shown for illustrative purposes in these figures, the member 15 represents a post or support made of metal formed in a U-shaped cross-section, which post is of the type that may be utilized in the exterior wall of a freight car or the like. The reverse U-shaped member 16 comprises a stiffening strip adapted to be fitted in the channel portion of the post member 15 so as to secure the adjacent edges of exterior metal sheets 17, 17 which form the exterior wall of the freight car. It will be understood, however, that my invention is not limited to freight car construction, but has wide application in many arts wherever two spaced members are to be secured together by means of screws or similar threaded members.

The essential features of my improved method illustrated in Figs. 1 and 2 is the arrangement of the screw holes 18 and coaxial tapped receiving holes 19 for the screws 10, 11 and 12 so that each of the latter are deliberately inclined or slanted with respect to the normal plane perpendicular to the spaced structural members 15 and 16. It is usually preferable to provide a plurality of screws arranged in staggered relation as clearly indicated in Fig. 2, so as to slant alternately at opposite angles to the resultant line of stress set up in an axial plane between the two members 15 and 16 when the series of screws are all screwed home. This axial plane of stress may be represented by the line A—A on Figs. 1 and 2, which is substantially perpendicular to the normal planes of members 15 and 16.

The screws may be of any standard form. In the form shown in Figs. 1 and 2, the heads of screws 10, 11 and 12 are of the usual tapered form, and also having a standard cross slot 21.

In the arrangement shown in these figures, all of the tapped holes 19 in member 15, although slanting alternately in opposite directions, are arranged in substantially longitudinal alignment with each other, whereas the corresponding screw holes 18 and adjacent counterbore 20 are formed in structural member 16 so as to be offset alternately on opposite sides of the axial line A—A.

The operation of the fastening means above disclosed will now be described. When the several screws 10, 11 and 12 are screwed home, it will be understood that the intermediate body portion of each screw which extends between the members 15 and 16 is placed under a substantial pulling stress. While each individual screw exerts a pull in the direction of its own axis, yet the arrangement of the two sets of screws slanting on opposite sides of the axial plane A—A will establish a mean or resultant average stress along said median plane. Due to the tension thus set up in the entire structure including the members 15, 16, and the U-shaped portions thereof which in effect form spacing members therefor, a definite line of stress is established along the median plane A—A which causes each of the screws to bend slightly from its own normal axis toward said median plane. This bending of each screw naturally tends to become localized at the weaker threaded end 19 of each screw, and particularly at the point where it enters member 15, and serves to distort or warp the threads of the screw at that point so as to resist unscrewing of the latter.

I find that this effect of bending the screws is especially enhanced in instances where the two structural members 15 and 16 are themselves normally subjected to substantial bending stresses along the axial plane A—A. Under these conditions so often present in structures of the general class herein described, the screws will become set in a bent condition, even without any particular effort to produce substantial strain when the screws are initially applied. In other words, the arrangement is such that the scews will automatically become bent to resist unscrewing thereof, due to the stresses and strains normally set up in the structure itself.

Fig. 3 illustrates a modified arrangement for carrying out my invention as applied to a pair of spaced plates 25 and 26, with block spacers 27, 27 of any suitable type interposed therebetween. In this arrangement it will be observed that the screw head is provided with a hexagonal socket 28 of a construction sometimes used for applying the screw with a special type of screw driver adapted to fit therein. This figure also illustrates an alternative arrangement of the screws whereby the several screw heads are arranged in longitudinal alignment with each other on the axial plane A—A, while the tapped apertures are offset on opposite sides of said plane. It will be understood, however, that the effect of this arrangement will be substantially the same as that of the form shown in Figs. 1 and 2.

Although I have illustrated and described certain embodiments of my invention, it will be understood that I do not wish to be limited to the exact construction shown and described, but that various changes and modifications may be made without departing from the spirit and scope of my invention as defined in the appended claims.

I claim as my invention:

1. The method of resisting accidental unscrewing of a plurality of threaded fastening members employed for fastening two structural members together under longitudinal pulling stress, which consists in disposing said threaded members in said structural members so as to be in substantially non-parallel relation with each other, and screwing home said threaded members so as to establish a resultant direction of stress between said structural members at a substantial angle to said fastening members when said structural members are in their assembled relation, whereby said threaded members are caused to bend laterally at their points of threaded connection with one of said structural members and the engaged threads thereof are distorted to resist unscrewing of said threaded members.

2. In combination with two structural members having spacing means therebetween, a plurality of screws adapted to connect said members together, said screws being disposed at varying angles with respect to said structural members and placed under longitudinal tension so as to establish a resultant pulling stress in a direction tending to bend the intermediate portions of each of said screws out of their respective normal axial alignment and distort the threaded portion of said screws where they engage one of said structural members so as to resist unscrewing from the latter.

3. In combination with two structural members, a plurality of threaded fastening members each having threaded engagement with one of said structural members to connect the two structural members together, said threaded members being disposed in non-parallel relation with each other and having their intermediate portions unrestricted to permit lateral bending thereof, and all of said threaded members being placed under longitudinal tension so as to establish a resultant pulling stress in a direction at a substantial angle to each of said threaded members so as to bend the intermediate portions of each of said threaded members out of their respective normal axial alignments and distort the threaded portions thereof where they engage their respective structural member so as to resist unscrewing of the latter.

HARVEY B. LINDSAY.